US008646036B2

(12) United States Patent
Kubota (10) Patent No.: US 8,646,036 B2
(45) Date of Patent: *Feb. 4, 2014

(54) NETWORK SYSTEM OF PROJECTOR

(75) Inventor: Shinji Kubota, Ima (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,868

(22) Filed: Jun. 25, 2012

(65) Prior Publication Data

US 2012/0266225 A1 Oct. 18, 2012

Related U.S. Application Data (63) Continuation of application No. 12/942,838, filed on Nov. 9, 2010, which is a continuation of application No. 11/032,134, filed on Jan. 11, 2005, now Pat. No. 7,865,932.

(30) Foreign Application Priority Data

Jan. 21, 2004 (JP) .................................. 2004-13216

(51) Int. Cl.
*G06F 7/04* (2006.01)

(52) U.S. Cl.
USPC ............................................................ 726/2

(58) Field of Classification Search
None
See application file for complete search history.

(56) References Cited

U.S. PATENT DOCUMENTS

| 4,430,526 A | 2/1984 | Brown et al. |
| 4,599,489 A | 7/1986 | Cargile |
| 4,800,590 A | 1/1989 | Vaughan |
| 5,572,193 A | 11/1996 | Flanders et al. |
| 5,758,079 A | 5/1998 | Ludwig et al. |
| 5,768,510 A | 6/1998 | Gish |
| 5,771,352 A | 6/1998 | Nakamura et al. |
| 5,877,747 A | 3/1999 | Kitao et al. |

(Continued)

FOREIGN PATENT DOCUMENTS

| EP | 0 656 581 A1 | 6/1995 |
| EP | 0 737 911 A1 | 10/1996 |

(Continued)

OTHER PUBLICATIONS

Berger et al., "Using Symbiotic Displays to View Sensitive Information in Public," Mar. 2005, Third IEEE International Conference on Pervasive Computing and Communications, pp. 139-148.

(Continued)

*Primary Examiner* — Peter Poltorak
(74) *Attorney, Agent, or Firm* — Oliff & Berridge, PLC (57) ABSTRACT

A network system of a projector is provided in which a network connection is established between a plurality of information terminal apparatus and the projector, and an image data file owned by an information terminal apparatus can be commonly used. A network system of a projector is arranged by an information terminal apparatus and a projector connectable to the information terminal apparatus via a network. The information terminal apparatus is arranged by a personal computer which supplies image data to the projector, and personal computers which are connected to this personal computer by a wireless manner When the network connection is established between the personal computer and the projector, and when the network connection between the personal computer and the personal computers is established, the image data is commonly used among these personal computers.

28 Claims, 4 Drawing Sheets

(56) References Cited

U.S. PATENT DOCUMENTS

| | | | |
|---|---|---|---|
| 6,141,000 A | 10/2000 | Martin | |
| 6,148,406 A | 11/2000 | Weisz et al. | |
| 6,169,976 B1 | 1/2001 | Colosso | |
| 6,345,294 B1 | 2/2002 | O'Toole et al. | |
| 6,417,933 B1 | 7/2002 | Szurkowski | |
| 6,493,467 B1 | 12/2002 | Okuda et al. | |
| 6,642,918 B2 | 11/2003 | Uchida et al. | |
| 6,670,603 B2 | 12/2003 | Shimada et al. | |
| 6,735,616 B1* | 5/2004 | Thompson et al. | 709/204 |
| 6,760,749 B1 | 7/2004 | Dunlap et al. | |
| 6,783,252 B1 | 8/2004 | Cambron | |
| 6,828,986 B2 | 12/2004 | Sakashita et al. | |
| 6,830,340 B2 | 12/2004 | Olson et al. | |
| 6,904,451 B1 | 6/2005 | Orfitelli et al. | |
| 6,904,526 B1 | 6/2005 | Hongwei | |
| 6,928,166 B2 | 8/2005 | Yoshizawa | |
| 6,957,232 B2 | 10/2005 | Hoeye et al. | |
| 7,016,935 B2 | 3/2006 | Lee et al. | |
| 7,018,043 B2 | 3/2006 | Castaldi et al. | |
| 7,047,088 B2 | 5/2006 | Nakamura et al. | |
| 7,139,248 B2 | 11/2006 | Murai et al. | |
| 7,191,214 B2 | 3/2007 | Watanabe | |
| 7,254,418 B2 | 8/2007 | Iwasaki | |
| 7,293,071 B2 | 11/2007 | Sato et al. | |
| 7,397,476 B2 | 7/2008 | Akaiwa et al. | |
| 7,403,510 B1 | 7/2008 | Miyake | |
| 7,447,906 B2 | 11/2008 | Kubota | |
| 7,486,254 B2 | 2/2009 | Suzuki et al. | |
| 7,647,555 B1 | 1/2010 | Wilcox et al. | |
| 7,770,210 B2 | 8/2010 | Kubota | |
| 7,782,330 B2 | 8/2010 | Akaiwa et al. | |
| 7,797,430 B2 | 9/2010 | Ichieda | |
| 7,965,284 B2 | 6/2011 | Akaiwa et al. | |
| 2001/0003479 A1 | 6/2001 | Fujiwara | |
| 2001/0017630 A1 | 8/2001 | Sakashita et al. | |
| 2001/0017712 A1 | 8/2001 | Kasatani | |
| 2001/0021980 A1 | 9/2001 | Linden et al. | |
| 2001/0037366 A1 | 11/2001 | Webb et al. | |
| 2002/0015175 A1 | 2/2002 | Katsuda | |
| 2002/0026512 A1 | 2/2002 | Nishimura et al. | |
| 2002/0036652 A1 | 3/2002 | Masumoto et al. | |
| 2002/0083319 A1 | 6/2002 | Ishiguro et al. | |
| 2002/0090912 A1 | 7/2002 | Cannon et al. | |
| 2002/0106086 A1 | 8/2002 | Kamiya et al. | |
| 2002/0108108 A1 | 8/2002 | Akaiwa et al. | |
| 2002/0122075 A1 | 9/2002 | Karasawa et al. | |
| 2002/0131078 A1 | 9/2002 | Tsukinokizawa | |
| 2002/0133713 A1 | 9/2002 | Fieschi et al. | |
| 2002/0154210 A1 | 10/2002 | Ludwig et al. | |
| 2002/0175915 A1 | 11/2002 | Lichtfuss | |
| 2002/0196378 A1 | 12/2002 | Slobodin et al. | |
| 2003/0017846 A1 | 1/2003 | Estevez et al. | |
| 2003/0028637 A1 | 2/2003 | Gross | |
| 2003/0034999 A1 | 2/2003 | Coughlin, III et al. | |
| 2003/0048281 A1 | 3/2003 | Murai et al. | |
| 2003/0051139 A1 | 3/2003 | Kubota | |
| 2003/0072429 A1 | 4/2003 | Slobodin et al. | |
| 2003/0081561 A1 | 5/2003 | Hsiao | |
| 2003/0088793 A1 | 5/2003 | Parry | |
| 2003/0110217 A1 | 6/2003 | Raju | |
| 2003/0115263 A1 | 6/2003 | Tran et al. | |
| 2003/0191738 A1* | 10/2003 | Hoeye et al. | 707/1 |
| 2003/0198347 A1 | 10/2003 | Ribes et al. | |
| 2003/0202661 A1 | 10/2003 | Rodriguez et al. | |
| 2003/0204716 A1 | 10/2003 | Rockwood et al. | |
| 2003/0217293 A1 | 11/2003 | Lee | |
| 2003/0221011 A1 | 11/2003 | Shitano | |
| 2003/0225641 A1 | 12/2003 | Gritzmacher et al. | |
| 2003/0236895 A1 | 12/2003 | Ohkubo et al. | |
| 2004/0051734 A1 | 3/2004 | Taniguchi et al. | |
| 2004/0073795 A1 | 4/2004 | Jablon | |
| 2004/0109137 A1 | 6/2004 | Bubie et al. | |
| 2004/0117445 A9 | 6/2004 | Lee et al. | |
| 2004/0119945 A1 | 6/2004 | Nakamura et al. | |
| 2004/0123118 A1 | 6/2004 | Dahan et al. | |
| 2004/0130502 A1 | 7/2004 | Sato et al. | |
| 2004/0130568 A1 | 7/2004 | Nagano et al. | |
| 2004/0161277 A1 | 8/2004 | Gassho et al. | |
| 2004/0227900 A1 | 11/2004 | Sato et al. | |
| 2004/0236943 A1 | 11/2004 | Edwards et al. | |
| 2004/0249945 A1 | 12/2004 | Tabuchi et al. | |
| 2005/0012911 A1* | 1/2005 | Cambron | 353/122 |
| 2005/0033805 A1 | 2/2005 | Fujiyama et al. | |
| 2005/0036509 A1 | 2/2005 | Acharya et al. | |
| 2005/0043973 A1* | 2/2005 | Childers | 705/5 |
| 2005/0066047 A1 | 3/2005 | Miyake et al. | |
| 2005/0068506 A1 | 3/2005 | Moriwaki et al. | |
| 2005/0071430 A1 | 3/2005 | Kobayashi et al. | |
| 2005/0091359 A1 | 4/2005 | Soin et al. | |
| 2005/0097179 A1 | 5/2005 | Orme | |
| 2005/0102356 A1 | 5/2005 | Manion et al. | |
| 2005/0262223 A1 | 11/2005 | Kimura | |
| 2006/0170875 A1 | 8/2006 | Falck et al. | |
| 2006/0184497 A1 | 8/2006 | Suzuki et al. | |
| 2006/0250585 A1 | 11/2006 | Anderson et al. | |
| 2007/0286144 A1 | 12/2007 | Miyake | |
| 2008/0234843 A1 | 9/2008 | Akaiwa et al. | |
| 2010/0257586 A1 | 10/2010 | Kubota | |
| 2011/0210977 A1 | 9/2011 | Akaiwa et al. | |

FOREIGN PATENT DOCUMENTS

| | | |
|---|---|---|
| EP | 0 874 300 A2 | 10/1998 |
| EP | 1 059 766 A2 | 12/2000 |
| JP | A-06-197340 | 7/1994 |
| JP | A-07-200215 | 8/1995 |
| JP | A-07-336370 | 12/1995 |
| JP | A-09-503877 | 4/1997 |
| JP | A-9-205643 | 8/1997 |
| JP | A-10-200638 | 7/1998 |
| JP | A-10-289106 | 10/1998 |
| JP | A-11-098170 | 4/1999 |
| JP | A-11-319815 | 11/1999 |
| JP | B2-3017925 | 12/1999 |
| JP | A-2000-076028 | 3/2000 |
| JP | A-2000-089726 | 3/2000 |
| JP | A-2000-122829 | 4/2000 |
| JP | A-2000-122944 | 4/2000 |
| JP | A-2000-165577 | 6/2000 |
| JP | A-2000-222163 | 8/2000 |
| JP | A-2001-016664 | 1/2001 |
| JP | A-2001-092408 | 4/2001 |
| JP | A-2001-103078 | 4/2001 |
| JP | A-2001-144767 | 5/2001 |
| JP | A-2001-175602 | 6/2001 |
| JP | A-2001-202316 | 7/2001 |
| JP | A-2001-273259 | 10/2001 |
| JP | A-2001-312472 | 11/2001 |
| JP | A-2001-343959 | 12/2001 |
| JP | A-2001-358919 | 12/2001 |
| JP | A-2002-007091 | 1/2002 |
| JP | A-2002-007350 | 1/2002 |
| JP | A-2002-044096 | 2/2002 |
| JP | A-2002-057964 | 2/2002 |
| JP | A-2002-099473 | 4/2002 |
| JP | A-2003-006128 | 1/2003 |
| JP | A-2003-069923 | 3/2003 |
| JP | A-2003-110555 | 4/2003 |
| JP | A-2003-173117 | 6/2003 |
| JP | A-2003-173177 | 6/2003 |
| JP | A-2003-256063 | 9/2003 |
| JP | A-2003-333559 | 11/2003 |
| JP | A-2004-062477 | 2/2004 |
| JP | A-2005-084846 | 3/2005 |
| JP | A-2005-099574 | 4/2005 |
| JP | B2-4022683 | 10/2007 |
| WO | WO 95/10823 | 4/1995 |
| WO | WO 99/37055 | 7/1999 |
| WO | WO 01/92953 A1 | 12/2001 |

OTHER PUBLICATIONS

Bloom, Jeffrey A., "Security and Rights Management in Digital Cinema," Jul. 2003, Proceedings of International Conference on (56) References Cited

OTHER PUBLICATIONS

Multimedia and Expo, vol. 1, pp. 621-624.
Dec. 6, 2011 Office Action issued in Japanese Application No. 2009-216796 (with translation).
Apr. 8, 2008 Office Action issued in U.S. Appl. No. 10/228,334.
Jan. 19, 2012 Office Action issued in U.S. Appl. No. 11/694,363.
May 26, 2010 Notice of Allowance issued in U.S. Appl. No. 11/905,084.
Oct. 16, 2009 Office Action issued in U.S. Appl. No. 11/905,084.
May 23, 2013 Office Action issued in U.S. Appl. No. 13/587,555.
May 9, 2013 Office Action issued in U.S. Appl. No. 12/628,654.
U.S. Appl. No. 12/942,838 in the name of Kubota filed Nov. 19, 2010.
U.S. Appl. No. 12/628,654 in the name of Sato et al. filed Dec. 1, 2009.
U.S. Appl. No. 13/618,130 in the name of Fujimori filed Sep. 14, 2012.
U.S. Appl. No. 13/531,048 in the name of Sato et al. filed Jun. 22, 2012.
U.S. App. No. 13/587,555 in the name of Kubota filed Aug. 16, 2012.
Sep. 2, 2008 Office Action issued in U.S. Appl. No. 11/032,134.
Mar. 16, 2009 Office Action issued in U.S. Appl. No. 11/032,134.
Jul. 27, 2009 Office Action issued in U.S. Appl. No. 11/032,134.
Mar. 3, 2010 Office Action issued in U.S. Appl. No. 11/032,134.
Aug. 9, 2010 Office Action issued in U.S. Appl. No. 11/032,134.
May 11, 2011 Office Action issued in U.S. Appl. No. 12/942,838.
Oct. 19, 2011 Office Action issued in U.S. Appl. No. 12/942,838.
Apr. 16, 2012 Office Action issued in U.S. Appl. No. 12/942,838.
Jan. 25, 2006 Office Action issued in U.S. Appl. No. 10/228,334.
Jul. 11, 2006 Office Action issued in U.S. Appl. No. 10/228,334.
Nov. 9, 2006 Office Action issued in U.S. Appl. No. 10/228,334.
May 2, 2007 Office Action issued in U.S. Appl. No. 10/228,334.
Jul. 18, 2007 Advisory Action issued in U.S. Appl. No. 10/228,334.
Dec. 27, 2007 Office Action issued in U.S. Appl. No. 10/228,334.
Apr. 8, 2008 Interview Summary issued in U.S. Appl. No. 10/228,334.
Aug. 5, 2008 Notice of Allowance issued in U.S. Appl. No. 10/228,334.
Tristan Richardson, et al., Virtual Network Computing, IEEE Internet Computing, Jan./Feb. 1998, vol. 2, No. 1, pp. 33-38.
Jul. 6, 2007 Office Action issued in Japanese Patent Application 11-360141 (translation only).
Dec. 3, 2010 Search Report issued in European Patent Application 10177908.0.
Dec. 3, 2010 Search Report issued in European Patent Application 10177910.6.
Dec. 6, 2010 Search Report issued in European Patent Application 10177911.4.
Aug. 31, 2011 Office Action issued in U.S. Appl. No. 12/493,809.
Jul. 12, 2013 Office Action issued in U.S. Appl. No. 12/942,838.
Nov. 13, 2013 Office Action issued in U.S. Appl. No. 12/628,654.
Nov. 8, 2013 Office Action issued in U.S. Appl. No. 13/531,048.
Nov. 14, 2013 Office Action issued in U.S. Appl. No. 13/587,555.
U.S. Appl. 14/084,014 in the names of Kubota filed Nov. 19, 2013.
Nov. 29, 2013 Office issued in U.S. Appl. No. 13/618,130.

\* cited by examiner

NETWORK SYSTEM OF PROJECTOR

This is a Continuation of application Ser. No. 12/942,838 filed Nov. 9, 2010, which is a Continuation of application Ser. No. 11/032,134 filed Jan. 11, 2005, which claim priority to JP 2004-13216 filed in Japan on Jan. 21, 2004. The disclosures of the prior applications are hereby incorporated by reference herein in their entireties.

BACKGROUND

Exemplary aspects of the present invention relate to a network system between an information terminal apparatus for supplying image data and a projector for projecting the image data.

Related art projectors project contents of display screens of information terminal apparatus, such as personal computers on screens in enlarge modes. These projectors are used in such a manner that the projectors are connected via networks to the personal computers by way of either wire communications or wireless communications. Specifically, such network systems of projectors using wireless LANs have been proposed due to simple network connectable characteristics, since these wireless LANs own less restrictions in locations.

In network systems of projectors with employment of wireless LANs, in order to establish network connections between personal computers and the projectors, passwords are necessarily required which are commonly used between transmission sides and reception sides of image data. Related art network systems of the projectors are disclosed in Japanese Laid-open patent Application No. 2003-69923 (pages 5 and 6, FIG. 1). In such a network system of a projector, while a password production unit for producing the above-described password, and a projection unit for projecting this produced password are provided in this projector, since this password is entered to a personal computer which will be connected, this personal computer is connected via a network to the projector.

SUMMARY

In accordance with the Japanese Laid-open patent Application No. 2003-69923 (pages 5 and 6, FIG. 1), such a system can be provided. Specifically, since both the information terminal apparatus for supplying the image data and the projector own the commonly-used password which is produced by the password production unit and is projected to the screen, the connection of the network is established. Also, even in such a case that the wireless LAN is employed, only users who are located in an environment that these users can commonly share the password projected to the screen can participate in the network.

However, when audiences view projected image data in a meeting room and a wide presentation hall, there is the possibility that images projected on the screen become small and can be hardly read by the audience. Also, there is a possibility that the audience wants to view other image data which has been stored in the same image data file as the projected image data, but has not yet been projected.

Exemplary aspects of the present invention is to provide a network system of a projector in which a plurality of information terminal apparatus capable of supplying image data are connected via a network to the projector. An image data file stored in the information terminal apparatus can be commonly used.

A network system of a projector, according to an exemplary aspect of the present invention, is featured by such a network system of a projector connectable to information terminal apparatus via a network. The information terminal apparatus includes a host information terminal apparatus to supply image data to the projector by employing a wireless LAN, and a client information terminal other than the host information terminal apparatus. When a network connection between the information terminal apparatus and the projector is established, the image data is commonly used between the information terminal apparatus.

In this case, as the information terminal apparatus, a notebook type personal computer may be employed.

Also, the host information terminal is a personal computer by which a presenter supplies image data to a projector. The client information terminal apparatus is a personal computer to which image data is supplied from a host information terminal apparatus owned by an audience.

Also, an operation to commonly use image data involves not only a projected image, but also another image data of an image data file to be projected, which has not yet been projected in the client information terminal apparatus. This image data file is supplied from, for example, the host information terminal apparatus. Further, the operation to commonly use the image data covers that a screen is enlarged, reduced, and moved.

In accordance with an exemplary aspect of the present invention, when the network connection by the wireless LAN is established between the projector and the host information terminal apparatus to supply the image data, since the network connection between the client information terminal apparatus and the host information terminal apparatus is also established, the image data supplied by the host information apparatus can also be commonly used by the client information terminal apparatus. Accordingly, the audience can view the presentation images on the screens of the own personal computers. As a consequence, even in such a case that an image which is projected in a wide hall, or is small-sized, sharp images can be viewed.

In the above-described arrangement, the projector may include a password production unit to produce a password used to establish the network connection with respect to the information terminal apparatus; and a projection unit to project both the password and a specific code of the projector when a power supply of the projector is turned ON.

Also, when a network connection by way of a wireless LAN is established, a password is required to be commonly used between an information terminal apparatus and a projector. However, in accordance with the above-described arrangement, while the password projection unit is provided on the side of the projector, both the password and the projector specific code are projected to be displayed. As a result, there is such an effect that the audience located in the presentation hall can grasp this password and the specific code of the projector. Thus, the personal computers owned by the presenter and owned by the audience can be easily connected to each other via the network.

In the above-described arrangement, the network connection between the projector and the information terminal apparatus may be established by inputting both the password and the specific code, which have been projected, into the information terminal apparatus.

Also, in the case that the projector is connected to the information terminal apparatus via the network, such an authenticating operation to authenticate, as to whether or not the connection counter party, corresponds to an authorized counter party is carried out by using the password. Since there are many possibilities that the information terminal apparatus are equipped with an input such as a keyboard and a mouse, both the projector specific code and the password can be easily inputted by employing the keyboard and the mouse.

Also, for instance, in the case that a plurality of projectors are prepared in the same presentation hall, if a power supply of a projector is turned ON, then a specific code of this projector is also projected. Therefore, since this specific code and a password are input, a plurality of projectors may be switched to be used.

Also, the password production unit may produce the password in an irregular manner when the power supply of the projector is turned ON.

In accordance with such an arrangement, this password is produced by the password production unit by employing, for example, a random number table when the power supply of the projector is turned ON. As a result, the password is produced and updated every time the projector is newly used (every time power supply is turned ON). As a consequence, in order to acquire this password, the audience must be present in the presentation hall, whereas when the audience is not present in the presentation hall, the audiences cannot acquire the password, and thus cannot establish the network connection. Therefore, there is another effect that information leakage can be protected.

The information terminal apparatus may include an information display area which is required for the network connection with respect to the projector. The information display area includes at least a projector list to indicate projectors connectable to the network, a connect operation display portion, a shared file display portion, and a password input display portion.

In this arrangement, the connect operation display portion includes such a display portion to issue instructions so as to participate in a network, to connect the network, or to disconnect the network. The shared file display portion indicates such an image data file that image data projected by a projector can be commonly used by client information terminal apparatus connected to the network.

The information terminal apparatus is equipped with the display portions related to such connect operations. In correspondence with these display portions, the specific code of the projector and the password are input so as to request an authentication operation for a network connection. As a result, both the presenter and the audiences can easily connect the information terminal apparatus and the projector for the presentation purpose.

In accordance with the arrangement of an exemplary aspect of the present invention, when the network connection between the information terminal apparatus and the projector is established, since a predetermined operation is carried out with respect to the client information terminal apparatus, the client information terminal apparatus may constitute a host information terminal apparatus. Image information supplied from the information terminal apparatus may be projected by the projector.

In this case, a predetermined operation may employ such an operation that an image data file is attached to the shared file display portion by way of a drag-and-drop operation.

If such an arrangement is employed, then the client information terminal apparatus can be replaced by the host information terminal apparatus at a glance. This implies that a plurality of presenters project new image data within a short time, and can commence the presentations. Also, this image data file can be commonly used by other information terminal apparatus.

Also, in the above-described arrangement, when the network connection between the host information terminal apparatus and the projector is established, a display area of both the specific code of the projector and the password may be displayed outside an area of the projected image data.

In this case, the operation that the display area is displayed outside the area of the image data includes that this display area is moved to such a position which does not impede the visual recognition of the projected image data, and this display area is reduced.

If such an arrangement is employed, then the specific code of the subject projector is continuously displayed which displays both the password and the image data required to establish the network connection. As a result, the network connection of the client information terminal apparatus owned by the audience is established, and the image data of the host information terminal can be viewed by the own client information terminal at any time when the image data is required.

Furthermore, in the above-described arrangement, the network system corresponds to a connection using a wireless cryptographic communication. The projector may preferably execute the wireless cryptographic communication with the host information terminal apparatus by employing the password.

In a network connection using a wireless LAN, since an unspecified large number of persons can access this network connection, a cryptographic wireless communication is employed. In an exemplary aspect of the present invention, the password is produced by the password production unit. Then, the cryptographic communication is carried out by employing this produced password between the projector and the information terminal apparatus, so that security of the information can be secured.

As previously explained, since the network connection is established only when the password projected on the screen is entered to the information terminal apparatus, only such an audience who is present in the presentation hall can participate in this network.

DETAILED DESCRIPTION OF EXEMPLARY EMBODIMENTS

Referring now to drawings, exemplary embodiments of the present invention will be described.

Figure 1:
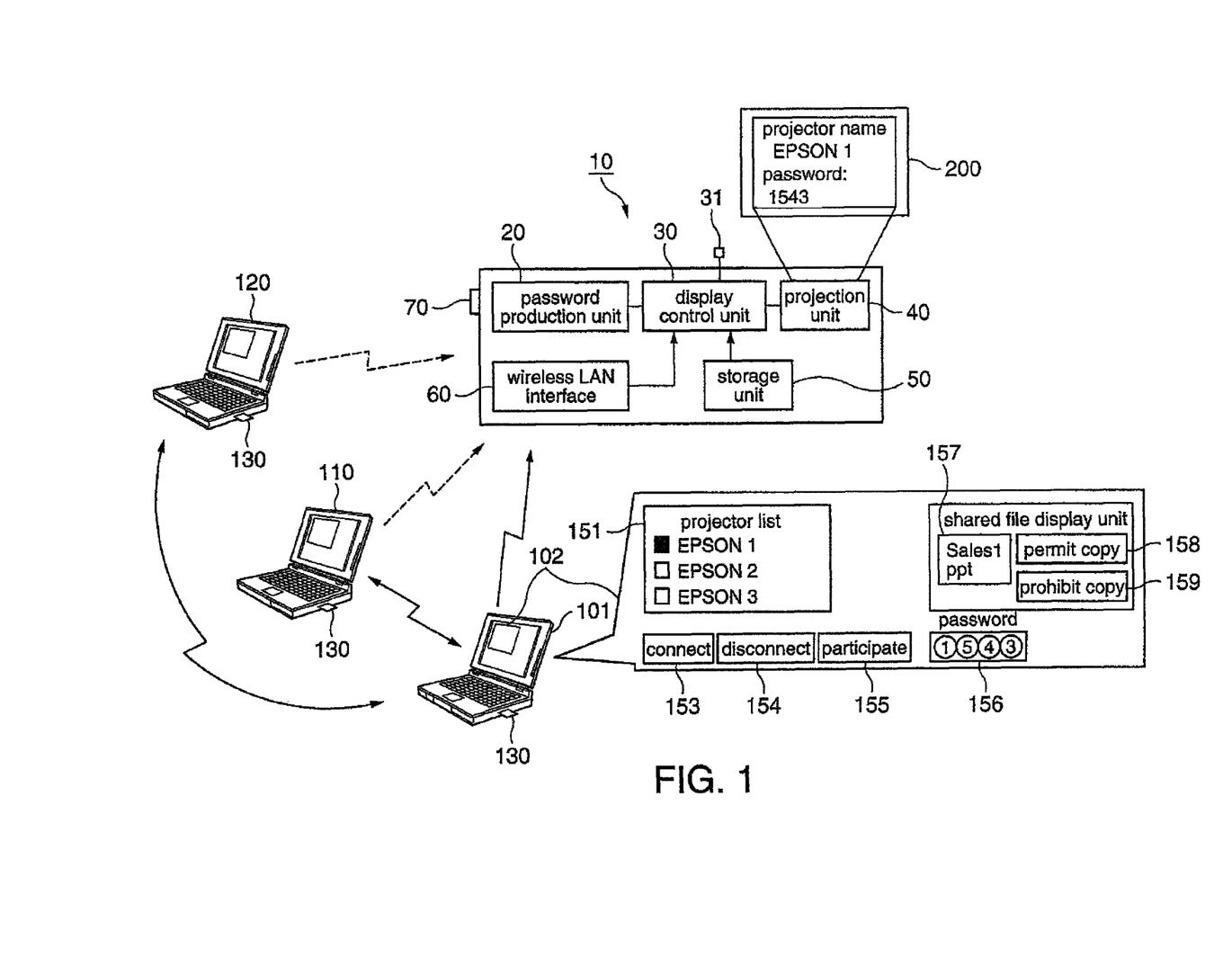
FIG. 1 is a schematic for showing an arrangement of a network system of a projector, according to an exemplary embodiment of the present invention.
Figure 2:
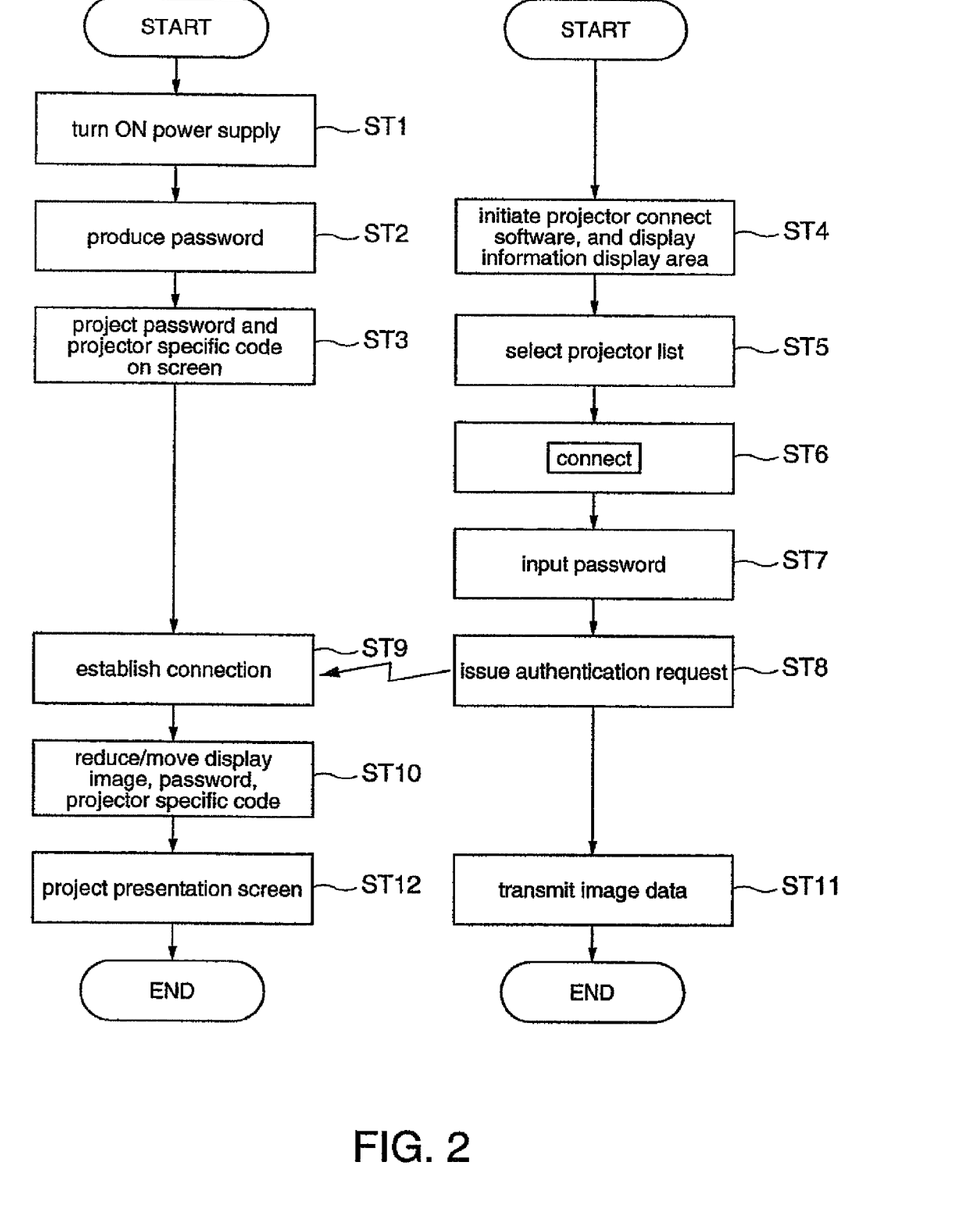
FIG. 2 is a flow chart for describing flow operations of network connections between the projector and the personal computer, according to an exemplary embodiment of the present invention.

In FIG. 1 and FIG. 2, a network system of a projector, according to an exemplary embodiment of the present invention is represented.

FIG. 1 is a schematic for explaining an arrangement as to the network system of the projector, according to an exemplary embodiment of the present invention.

In FIG. 1, the network system of the projector, according to this exemplary embodiment, is arranged in such a manner that a projector 10 is connected via a network to personal computers 101, 110, and 120 by way of a wireless communication. It should be understood that although three sets of the personal computers are connected in the network system of FIG. 1, a total number of these personal computers is not limited to only three, but may be arbitrarily selected. Alternatively, other sorts of information terminal apparatus may be employed instead of these personal computers. It should also be noted that this network system of the projector is used in such limited spaces within presentation rooms, e.g., a meeting room, a lecture hall, and the like.

Wireless LAN cards 130 used to perform wireless communications have been inserted into the personal computers 101, 110, and 120. While the wireless LAN cards 130 are employed, the projector 10 is mutually communicated with the above-described personal computers. In this exemplary embodiment, the personal computer 101 will now be explained as a host information terminal apparatus which transmits image data to the projector 10, whereas the personal computers 110 and 120 will now be explained as client information terminal apparatus other than the above-described host information terminal apparatus.

The projector 10 corresponds to a so-called "data projector" which projects the image data received from the personal computer 101 on a screen 200 in an enlarge mode. Both the projector 10 and the personal computer 101 perform a cryptographic communication. In this exemplary embodiment, while the same password is set to the projector 10, and the personal computers 101, 110, 120 respectively, this network system is assumed to be operated in such a manner that authentication of network connections, encrypting operations, and decrypting operations are carried out by using this set password.

The projector 10 is equipped with a power supply switch 70, a password production unit 20, a display control unit 30, a projection unit 40, and a wireless LAN interface 60. The password production unit 20 produces the password. The projection unit 40 projects image data on the screen 200. The wireless LAN interface 60 performs a wireless communication, This projector 10 is further provided with a storage unit 50 which stores thereinto setting information used in network connections, for example, communication protocols, addresses, and the like.

When the power supply switch 70 is turned ON, the password production unit 20 produces a password which is commonly employed in the wireless LAN interface 60 of the projector 10, and the personal computers 101, 110, and 120 (will be explained later). In this exemplary embodiment, it is assumed that a random number table is employed so as to produce the password. In this case, since a power supply of the projector 10 is turned ON (power supply switch 70 is turned ON), the password is produced in a discontinuous manner. Also, when the power supply of the projector 10 is turned OFF, the password is reset.

It should also be noted that when the power supply is turned ON, both the produced password and a specific code of the projector 10 which is used are projected on the screen 200.

The display control unit 30 executes various image processing operations with respect to the image data inputted from the personal computer 101 so as to produce an image which is projected by the projection unit 40. In this case, when the power supply is turned ON, as represented in the drawing, the password (specifically, numerals of 4 digits in drawing) and the projector specific code (displayed as "EPSON 1" in drawing) are projected on the screen 200. While a display designation unit 31 is connected to the display control unit 30, since a user manipulates the display designation unit 31, display positions and dimensions of characters as to the password and the specific code of the projector 10 on the screen 200 can be arbitrarily designated in order that the user can easily view these password and specific code of the projector 10.

The wireless LAN interface 60 is equipped with a cryptographic communication unit (not shown) which executes an authenticating operation of a network connection by using the password produced in the password production unit 20. Also, the cryptographic communication unit decrypts image data which has been encrypted and is received from the personal computer 101, and then, supplies the decrypted image data to the display control unit 30.

Although not shown in the drawing, each of the personal computers 101, 110, 120 is equipped with a communication unit (to which wireless LAN card is inserted), application software, an input unit, and the like. Users of the personal computers 101, 110, 120 enter the password and the specific code of the projector 10, which are projected on the above-described screen 200 by operating a keyboard and a mouse (both devices are not shown). In this case, a projector list 151 of subject projectors which project image data; a disconnect display portion 154, a connect display portion 153, and a participate portion 155, which are provided as operation display portion; a shared file display portion 157 which displays an image data file which are shared; and also, a password input display portion 156 are displayed in an information display area 102 of a display screen of each of the personal computers 101, 110, 120, which is required for a network connection. If such an image data located in an internal memory of a personal computer, a memory card, a network server, or the like is attached to the shared file display portion, then this image data is allowed to be commonly used.

Since the respective function indications displayed on the information display area 102 are clicked, functions may be selected and may be instructed. In FIG. 1, numerals of 4 digits "1543" are entered as the password, an indication of "EPSON 1" is selected from the projection list 151 to be entered. Either the connect display portion 153 or the participate display portion 155 is clicked, so that a network connection between the projector 10 and the personal computer 101 is established.

In the case that a network connection between the host information terminal apparatus and the client information terminal apparatus is established, and an image data file is commonly used, such a possibility may be conceived. Specifically, this image data file is copied contrary to an intention of a presenter. As a consequence, in this exemplary embodiment, as shown in FIG. 1, while both a copy permit display portion 158 and a copy prohibit display portion 159 are displayed in the connect information display area 102, in such a case that the presenter permits a copy of the image data file, since the presenter selects the copy permit display portion 158, copying of the image data file may be permitted. Since the presenter selects the copy prohibit display portion 159, copying of the image data file may not be permitted.

Subsequently, a description is made of sequential operation as to network connections between the projector 10 and the personal computer 101 (functioning as host information terminal apparatus).

FIG. 2 is a flow chart for describing flow operations as to the network connection between the projector 10 and the personal computer 101. In this drawing, a left-sided portion shows a flow operation of the projector 10 and a right-sided portion indicates a flow operation of the personal computer 101. First, when the power supply of the projector 10 is turned ON (power supply switch 70 is turned ON) (ST1), a password is produced by the password production unit 20 (ST2). Then, the produced password is projected on the screen 200 in combination with the specific code of the projector 10 (ST3). On the side of the host information terminal apparatus, projector connect software of the personal computer 101 is initiated (ST4). At this time, the information display area 102 is displayed on the display screen of the personal computer 101.

Subsequently, the user selects the projector specific code projected on the screen 200 from the projector list 151 (ST5), and clicks the connect display portion 153 (ST6). Next, when the password is entered by manipulating the keyboard or the like (ST7), since the personal computer 101 establishes a communication connection with respect to the projector 10, the personal computer 101 issues an authentication request for a network connection by employing the password and the projector specific code, which have been entered (ST8).

The projector 10 confirms coincidence of the password and the projector specific code in response to the authentication request issued for the personal computer 101. Thus, a communication is established between the projector 10 and the personal computer 101 (ST9). When the communication is established, the indications as to the projector specific code, which are projected on the screen 200, are reduced. Then, the reduced indications are moved to such a position where these reduced indications do not impede visual confirmations of presentation images (ST10). It should also be noted that the projection of the password may be alternatively stopped after a predetermined time period has elapsed since the projection of this password was commenced. In this alternative case, secrecy of the password may be enhanced.

If the connection of the network has been established in the above-described manner, then the communication between the projector 10 and the computer 101 may be carried out.

Thus, the personal computer 101 transmits image data for a presentation purpose (ST11). As a result, the projector 10 executes an image processing operation, and then, projects this image data on the screen 200 (ST12).

It should also be noted that the above-explained reduction of the password and the like may be alternatively carried out after the image data (presentation image) has been projected.

Subsequently, a description is made of network connections of the personal computers 110 and 120 as other client information terminal apparatus.

Figure 3:
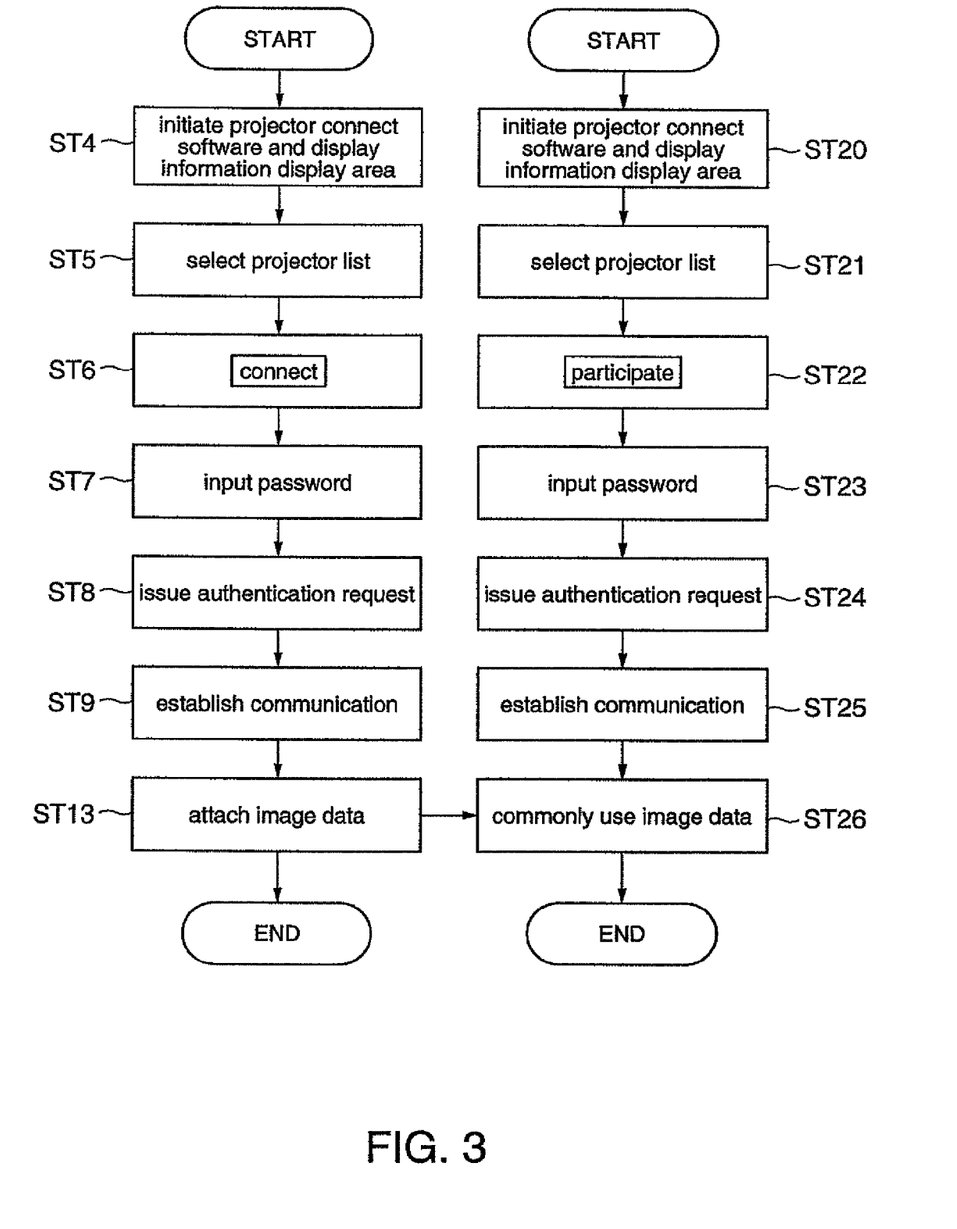
FIG. 3 is a flow chart for describing flow operations of network connections among the personal computers, according an exemplary embodiment of the present invention.

FIG. 3 is a flow chart for explaining sequential operations of a network connection between a personal computer 110 functioning as the client information terminal apparatus and the personal computer 101 functioning as the host information terminal apparatus. Since the personal computer 120 may also be connected via the network to the personal computer 110 in accordance with the same sequential operations, explanations thereof are omitted. In FIG. 3, a left-sided portion indicates a flow operation of the personal computer 101, and a right-sided portion represents a flow operation of the personal computer 110. In this case, in the personal computer 101, the network connection with the projector 10 has been established in accordance with the above-explained sequential operation (ST9). Thereafter, the image data has been attached to the shared file display portion 157 (ST13), so that sharing of the image data has been permitted.

Flow operations defined from an initiation of the projector software (ST20) from an authentication request (ST24) as to the personal computer 110 are the same flow operations (ST4 to ST9) of the personal computer 101. However, since the personal computer 110 does not transmit an image, but establishes a connection for commonly used image data, the participate display portion 155 is clicked (ST22). As a result, when a communication between the projector 10 and the personal computer 110 is established (ST25), this communication channel is commonly used within the network system, so that the network connection between the personal computer 101 and the personal computer 110 is authentically established, and the image data which has been permitted to be commonly used can be viewed by the personal computer 110 (ST26).

At this time, since the image data is attached to the shared file display portion 157 of the personal computer 101 (ST13), the attached image data file is brought into such a condition that this image data file has been stored in a virtual disk in the personal computer 110. Thus, the image data which has been permitted to be shared may be read out so as to be viewed. Also, the user of the personal computer 110 may freely enlarge the image data and may freely move the display position thereof by operating the keyboard, the mouse, and the like.

Next, a description is made of sequential operations in which image data held by the personal computer 110 is supplied instead of the personal computer 101.

Figure 4:
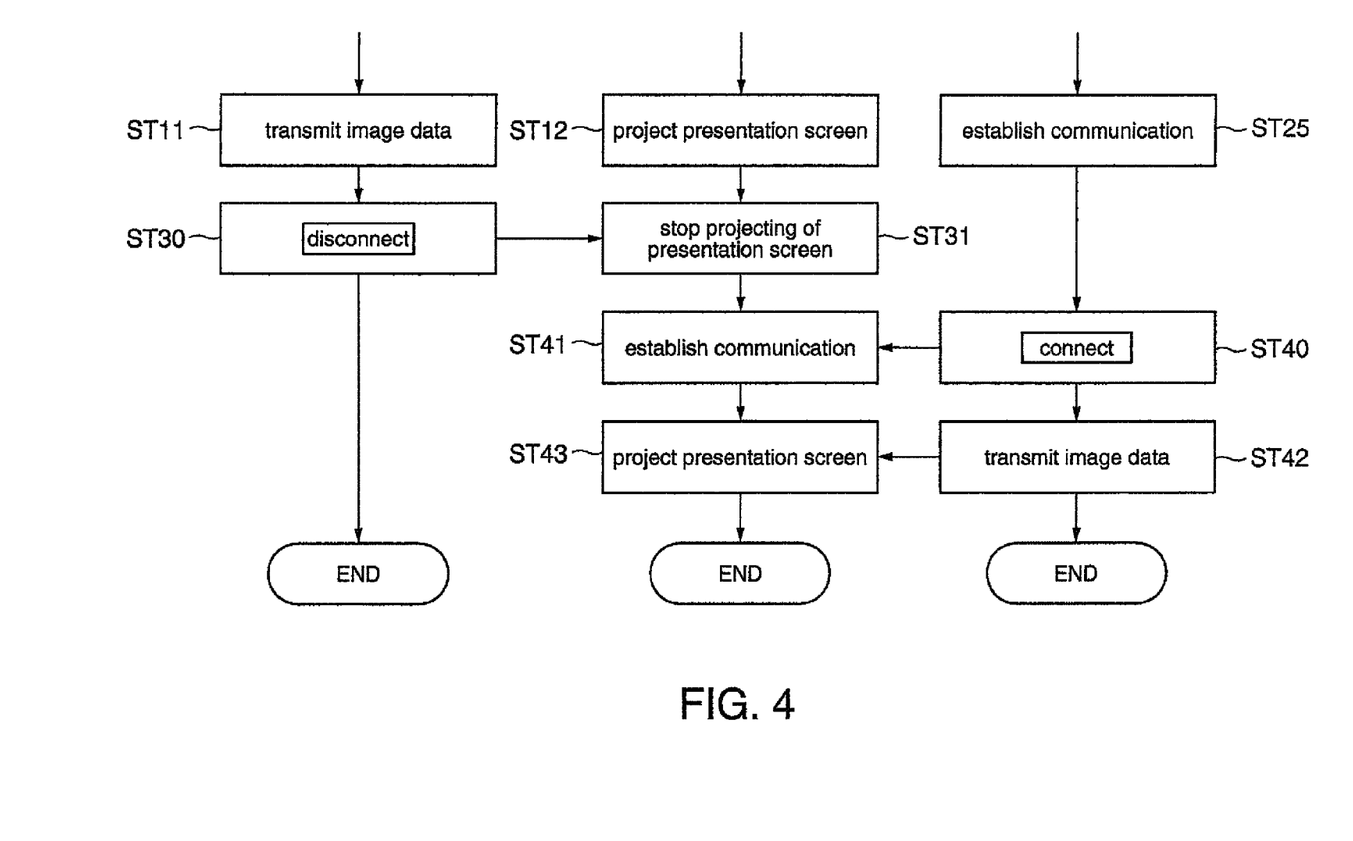
FIG. 4 is a partial flow chart for showing flow operations of supplying image data held by a personal computer 110, according an exemplary embodiment of the present invention.

FIG. 4 is a partial flow chart to indicate the above-explained sequential operations. A left-sided portion indicates a flow operation of the personal computer 101, a center portion indicates a flow operation of the projector 10, and a right-sided portion shows a flow operation of the personal computer 110. Since the personal computer 120 is operated in accordance with the same sequential operation as that of the personal computer 110, explanations thereof are omitted. In FIG. 4, the flow operation of the personal computer 101 until the transmission of the image data (ST 11) is identical to the flow operation shown in FIG. 2. At this time, in such a case that the image data is substituted by the image data of the personal computer 110 to be projected, in the personal computer 101, the disconnect display portion 154 displayed in the information display area 102 required for the network connection is clicked so as to disconnect the supply of the image data to the projector 10 (ST30). The projector 10 stops the projection of the presentation screen (ST31).

Since the flow operation shown in FIG. 3 up to the establishment of the communication (ST25) is identical to that of the personal computer 110, explanations thereof are omitted. When the connect display portion 153 is clicked (ST40) after the supply of the image data from the personal computer 101 to the projector 10, a communication between the personal computer 110 and the projector 10 is established (ST41), the image data of the personal computer 110 is transmitted to the projector 10 (ST42). Then, the projector 10 projects the image data of the personal computer 110 on the screen 200 (ST43). This operation implies that the personal computer 110 is substituted by the host information terminal apparatus, and the personal computer 101 is substituted by the client information terminal apparatus identical to the personal computer 120.

It should be understood that since the personal computer 110 constitutes the host information terminal in this case, the image data is attached to the shared file display portion 157 and the image data is permitted to be commonly used. Also, the personal computer 101 can view the image which has been permitted to be commonly used as the client information terminal apparatus.

Also, in accordance with the arrangement of the above-explained exemplary embodiment, the client information terminal apparatus can also acquire not only the image data (image file) of the host information terminal apparatus, but also the image data which is transmitted from the host information terminal apparatus to the projector so as to display these acquired image data. Even on the side of the client information terminal, the image data may be attached to the shared file display portion. Thus, the host information terminal apparatus may also refer to this image data.

Also, while the host information terminal apparatus is substituted by the client information terminal apparatus, before the host information terminal apparatus is disconnected, the client information terminal apparatus may merely click the connection so as to execute the substitution.

Further, in such a case that there is no information terminal apparatus which transmits image data to the projector 10, specifically, even under such a condition that all of the members participate, the image data may be commonly used.

While such an image data transmitted from the host information terminal apparatus to the projector 10 is not equal to image data itself, but equal to data of an image data file, the projector 10 may have a function capable of reproducing the image file.

As a consequence, in accordance with the above-described exemplary embodiment, when the network connection by the wireless LAN is established between the projector 10 and the personal computer 101 as the host information terminal apparatus to supply the image data, since the network connection between the personal computer 110 and 120 as the client information terminal apparatus and the personal computer 101 is also established, the image data supplied by the personal computer 101 can also be commonly used by other personal computers 110 and 120. Accordingly, the audience can view the presentation images on the screens of the own personal computers. As a consequence, even in such a case that an image which is projected on the screen 200, or in a wide hall is small-sized and can be hardly visually recognized, sharp images can be viewed.

Also, when a network connection by way of a wireless LAN is established, a password is required to be commonly used between an information terminal apparatus and a projector. However, in accordance with the arrangement of the above-explained exemplary embodiment, while the password projection unit 20 is provided on the side of the projector 10, the password is immediately produced when the power supply of the projector 10 is turned ON, and then, both this password and the projector specific code are projected to be displayed. As a result, there is such an effect that the audience located in the presentation hall can grasp this password and the specific code of the projector 10. Thus, the information terminal apparatus owned by the presenter and the information terminal apparatus owned by the audiences can be easily connected to each other via the network.

This password is produced and updated by the password production unit 20 by employing, for example, a random number table when the power supply of the projector 10 is turned ON. As a result, the password is updated every time the projector 10 is newly used. As a consequence, in order to acquire this password, the audiences must be present in the presentation hall, whereas when the audiences are not present in the presentation hall, the audiences cannot acquire the password, and thus cannot establish the network connection. Therefore, there is another effect that the information leakage can be protected.

Also, in the case that the projector 10 is connected to the personal computers 101, 110, 120 via the network, such an authenticating operation to authenticate as to whether or not the connection counter party corresponds to an authorized counter party is carried out by using the password. Since there are many possibilities that the personal computers 101, 110, 120 are equipped with the input, such as the keyboard and the mouse, both the projector specific code and the password can be easily inputted by employing the keyboard and the mouse.

Also, for instance, in the case that a plurality of projectors are prepared in the same presentation hall, if a power supply of a projector is turned ON, then a specific code of this projector is also projected. Therefore, since this specific code and a password are inputted, a plurality of projectors may be switched to be used.

Furthermore, in the above-described exemplary embodiment, each of the personal computers 101, 110, 120 is equipped with the information display area 102 which is required to be network-connected to the projector 10. In this information display area 102, at least the display items required for the network connection are provided. In correspondence with these display items, both the projector specific code and the password are entered which are projected, and the network connection authentication request is transmitted. As a result, the personal computers 101, 110, 120 which are held by the presenter and the audiences can be easily network-connected to the projector 10 used in the presentation.

Also, when the network connection between the personal computer 101 and the projector 10 has been established, the image data file which has been stored in either the personal computer 110 or the personal computer 120 is moved in a drag-and-drop manner to the shared file display portion of the personal computer 110, or 120 functioning as the client information terminal apparatus, so that the image information supplied from either the personal computer 110 or the personal computer 120 can be projected. As a result, the client information terminal apparatus can be replaced by the host information terminal apparatus at a glance. This fact may indicate that a plurality of presenters are replaced by each other within a short time, and new image data can be projected so as to commence the presentation. Also, this image data file may be commonly used apparently by the personal computer 101, and further by the personal computers owned by other users.

In the above-described exemplary embodiment, when the network connection between the projector 10 and the personal computer 101 functioning as the host information terminal apparatus, or when the image data for the presentation purpose is projected, the display area to display both the projector specific code and the password is reduced. Then, the reduced display area is continuously displayed outside the display area for the projected image data. As a result, the network connection of the personal computer as the client information terminal apparatus owned by the audience is established, and the image data of the personal computer as the host information terminal can be viewed by the own personal computer at any time when the image data is required.

In a network connection using a wireless LAN, since an unspecified large number of persons can access this network connection, a cryptographic wireless communication is employed. In the above-described exemplary embodiment, the password is produced by the password production unit 20. Then, the cryptographic communication is carried out by employing this produced password between the projector 10 and the personal computers 101, 110, 120, so that security of the information can be secured.

As previously explained, since the network connection is established only when the password projected on the screen 200 is entered to the information terminal apparatus, only such an audience who is present in the presentation hall can participate in this network.

It should be understood that the present invention is not limited only the above-described exemplary embodiment, but may be modified and/or enhanced.

For example, in the above-described exemplary embodiment, the network connection is established between three sets of the personal computers 101, 110, 120 (see FIG. 1) and the projector 10. Since the communications used for this network connection are the same communication channel, a total number of these personal computers is not limited, so that a large number of audiences can participate in this network.

Also, in the above-described exemplary embodiment, the password is produced when the power supply of the projector 10 is turned ON. Alternatively, a password production instructing unit may be provided in the projector 10, and this password may be produced by receiving an instruction of a user.

If such a password production instructing unit is employed, then the production of the password is carried out by receiving the instruction of the user, an illegal connection to the network and interception of communication data can be prevented.

Also, although the above-explained exemplary embodiment has described such a case that the wireless communication is carried out by employing the wireless LAN. Alternatively, exemplary aspects of the present invention may be applied to such a case that a wire communication is employed.

Further, in the above-described exemplary embodiment, the image projection system using the projector 10 has been described. Alternatively, exemplary aspects of the present invention may be applied to another image display system in which an image display apparatus is connected to an information terminal apparatus via a network.

As a consequence, in accordance with the above-described exemplary embodiment, such a network system of the projector can be provided in which the plurality of information terminal apparatuses capable of supplying the image data are connected to the projector via the network, and the image data file stored in the information terminal apparatus can be commonly used.

What is claimed is:

1. A projector capable of communicating with an image supply apparatus supplying an image data via a network, the projector comprising:
   a password production unit that outputs a correct password;
   a network interface that receives an input password that is transmitted from the image supply apparatus to the projector; and
   a projection unit that projects the correct password at a display position of a password on a screen; wherein
   after the input password matches the correct password, the display position of a password changes.

2. The projector according to claim 1 further comprising a storage unit that stores a specific code used by the image supply apparatus for establishing connection with the projector, the projection unit projects the specific code with the correct password.

3. The projector according to claim 1, the password production unit outputs the correct password by using a random number table.

4. The projector according to claim 1, the password production unit outputs the correct password when the projector is turned ON.

5. The projector according to claim 1, the projector further comprising a password production instructing unit that instructs the password production unit to output the correct password when an operation for outputting the correct password is received.

6. The projector according to claim 1, wherein
   the projector is connected to the image supply apparatus by way of wireless communication.

7. The projector according to claim 1, wherein
   the correct password is numerals of 4 digits.

8. A projector capable of communicating with an image supply apparatus supplying an image data via a network, the projector comprising:
   a password production unit that outputs a correct password;
   a network interface that receives a password that is transmitted from the image supply apparatus to the projector; and
   a projection unit that projects the correct password on a screen; wherein
   after the password that has been transmitted from the image supply apparatus matches the correct password, the matched password is displayed at a different position on the screen from a previously displayed position of the correct password.

9. The projector according to claim 8 further comprising a storage unit that stores a specific code used by the image supply apparatus for establishing connection with the projector, the projection unit projects the specific code with the correct password.

10. The projector according to claim 8, the password production unit outputs the correct password by using a random number table.

11. The projector according to claim 8, the password production unit outputs the correct password when the projector is turned ON.

12. The projector according to claim 8, the projector further comprising a password production instructing unit that instructs the password production unit to output the correct password when an operation for outputting the correct password is received.

13. The projector according to claim 8, wherein
   the projector is connected to the image supply apparatus by way of wireless communication.

14. The projector according to claim 8, wherein
   the correct password is numerals of 4 digits.

15. A projector capable of communicating with an image supply apparatus supplying an image data via a network, the projector comprising:
   a password production unit that outputs a correct password;
   a network interface that receives an input password that is transmitted from the image supply apparatus to the projector; and
   a projection unit that projects the correct password on a screen; wherein
   after the input password matches the correct password, the matched password is displayed at a different position on the screen from a previously displayed position of the correct password.

16. The projector according to claim 15 further comprising a storage unit that stores a specific code used by the image supply apparatus for establishing connection with the projector, the projection unit projects the specific code with the correct password.

17. The projector according to claim 15, the password production unit outputs the correct password by using a random number table.

18. The projector according to claim 15, the password production unit outputs the correct password when the projector is turned ON.

19. The projector according to claim 15, the projector further comprising a password production instructing unit that instructs the password production unit to output the correct password when an operation for outputting the correct password is received.

20. The projector according to claim 15, wherein
the projector is connected to the image supply apparatus by way of wireless communication.

21. The projector according to claim 15, wherein
the correct password is numerals of 4 digits.

22. A projector capable of communicating with an image supply apparatus supplying an image data via a network, the projector comprising:
- a password production unit that outputs a correct password;
- a network interface that receives a password that is transmitted from the image supply apparatus to the projector; and
- a projection unit that projects the correct password at a display position of a password on a screen; wherein
after the password that has been transmitted from the image supply apparatus matches the correct password, the display position of a password changes.

23. The projector according to claim 22 further comprising a storage unit that stores a specific code used by the image supply apparatus for establishing connection with the projector, the projection unit projects the specific code with the correct password.

24. The projector according to claim 22, the password production unit outputs the correct password by using a random number table.

25. The projector according to claim 22, the password production unit outputs the correct password when the projector is turned ON.

26. The projector according to claim 22, the projector further comprising a password production instructing unit that instructs the password production unit to output the correct password when an operation for outputting the correct password is received.

27. The projector according to claim 22, wherein
the projector is connected to the image supply apparatus by way of wireless communication.

28. The projector according to claim 22, wherein
the correct password is numerals of 4 digits.

* * * * *